(12) United States Patent
Christodoulou et al.

(10) Patent No.: US 6,907,896 B1
(45) Date of Patent: Jun. 21, 2005

(54) TAPPING FITTING

(75) Inventors: Mario J. Christodoulou, Lincoln (GB); Bowman A. Bowman, Chesterfield (GB)

(73) Assignee: Uponor Innovation AB (SE)

( * ) Notice: Subject to any disclaimer, the term of this patent is extended or adjusted under 35 U.S.C. 154(b) by 0 days.

(21) Appl. No.: 10/416,903
(22) PCT Filed: Nov. 29, 2001
(86) PCT No.: PCT/GB01/05295

§ 371 (c)(1),
(2), (4) Date: Sep. 4, 2003

(87) PCT Pub. No.: WO02/44608

PCT Pub. Date: Jun. 6, 2002

(30) Foreign Application Priority Data

Nov. 29, 2000 (GB) .............................. 0029037

(51) Int. Cl.[7] .......................... F16K 43/00; F16L 41/06
(52) U.S. Cl. ...................... 137/318; 30/93; 137/15.14; 285/197; 408/67; 408/101
(58) Field of Search ............... 30/93; 83/54; 137/15.13, 137/15.14, 318; 285/197, 198, 199; 408/67, 101, 102, 137, 138

(56) References Cited

U.S. PATENT DOCUMENTS

| | | | | |
|---|---|---|---|---|
| 3,756,261 A | * | 9/1973 | Minchhoff | 137/318 |
| 4,029,118 A | * | 6/1977 | Merideth | 137/318 |
| 4,626,142 A | | 12/1986 | Brin et al. | 408/81 |
| 5,286,070 A | | 2/1994 | Williams | 285/197 |
| 5,345,964 A | * | 9/1994 | Friedel | 137/318 |
| 5,577,529 A | * | 11/1996 | Katz | 137/318 |
| 5,732,732 A | * | 3/1998 | Gross et al. | 137/318 |
| 5,819,815 A | | 10/1998 | Nickens et al. | 141/51 |
| 5,964,240 A | * | 10/1999 | Granovski | 137/318 |
| 5,975,117 A | * | 11/1999 | Schweitzer et al. | 137/318 |
| 6,012,878 A | | 1/2000 | Hicks | 408/1 |
| 6,202,673 B1 | * | 3/2001 | Bunger | 137/318 |
| 6,260,573 B1 | * | 7/2001 | Lehmann et al. | 137/318 |

FOREIGN PATENT DOCUMENTS

| | | |
|---|---|---|
| DE | 43 09 941 | 9/1994 |
| DE | 195 00 950 | 7/1996 |
| DE | 195 12 591 | 10/1996 |
| DE | 196 41 803 | 4/1998 |
| EP | 0 723 104 | 7/1996 |
| EP | 0 754 900 | 4/1999 |
| FR | 2 773 204 | 12/1997 |
| FR | 2 788 582 | 1/1999 |
| GB | 2 039 658 | 8/1980 |
| GB | 2 080 464 | 2/1982 |
| GB | 2 103 321 | 2/1993 |
| GB | 2 287 294 | 9/1995 |

* cited by examiner

Primary Examiner—George L. Walton
(74) Attorney, Agent, or Firm—Sheridan Ross P.C.

(57) ABSTRACT

Tapping fitting (1) suitable for application to a plastic pipe (P), comprising: a housing (5) including a hollow main section (6), the housing being attachable to a pipe (P); a cutter assembly (13) mountable within the hollow main section (6) and axially moveable therein into a cutting position wherein the cutting blade (14) engages the surface of a pipe (P) to which the fitting is attached; and a direct seal (23) between the housing (5) and the cutter assembly (13), wherein, in use, the seal (23) is maintained between the housing (5) and the cutter assembly (13) regardless of the axial position of the cutter assembly (13) within the housing (5).

20 Claims, 7 Drawing Sheets

TAPPING FITTING

This invention relates to the field of a tapping fitting or tapping tee for application to a pipe in order to create a branch conduit for example. The tapping fitting is particularly, but not exclusively, suitable fox use in electro-fusion fittings for plastic pipes.

A known tapping fitting is described in EP0754900 (Plasson) in which a rotatable blade assembly has an externally-threaded head which is used to advance a threaded cutting blade down the inside of the main body of the fitting towards the pipe to be cut.

The external thread on the head and the corresponding thread on the interior of the body need to be of relatively narrow pitch which requires precision in manufacture. The thread can be machined for maximum accuracy but this is a necessarily expensive manufacturing procedure. Alternatively, the threaded body could be moulded around a threaded core, but this requires the core to be spun-off or unscrewed from the body thus produced, which is time-consuming especially if the thread is long.

The components of the known tapping fitting need to be deburred before use, because of the high accuracy of thread required and this is also a time-consuming process.

Furthermore, this type of fitting is time-consuming to manufacture because of the need to screw the rotatable blade assembly into the main body thread.

A further significant problem with tapping fittings occurs due to the fact that the fittings are used to tap into high pressure liquid or gas supply pipes which results, in use, with the tapping fitting leaking pressurized liquid or gas during and/or after the cutting operation. In particular, the gas or liquid can leak past the screw thread of a threaded tapping fitting, this problem being commonly known as "blow-back" or "blow-by".

EP0754900 (Plasson) alleviates the problem of blow-by by the provision of O-ring seals 46 and 50(see Figures of Plasson) in conjunction with a moulding (hollow stem 4). As can be seen from Plasson, the hollow stem 4 is sealed with respect to the cutter assembly 3 by means of O-ring 46 (see FIG. 5). The hollow stem 4 is sealed with respect to the housing main section 20 by O-ring 50 (see FIG. 4). Both O-rings and the hollow stem are required in order to seal possible leakage paths effectively. This arrangement is relatively complex and therefore expensive to manufacture. Furthermore, because the final sealing takes place relatively near the top of the housing main section 20, the housing main section (or "stack") is necessarily under the same pressure as the main pipe, once the main pipe has been cut. Therefore the stack must be sufficiently strong to withstand these stresses over the designated lifetime of the fitting.

A fitting manufactured by Friatec (formerly known as Friedrichsfeld) and illustrated on page 6 of their catalogue reference number 1457 e.2.XI.91 Mz alleviates some of the problems with Plasson. This fitting 100 is illustrated in longitudinal cross-section in FIGS. 1 and 1A.

The Friatec fitting 100 comprises a machined metal insert 101 which has an internal thread 101*a*. A metal cutter 102 is provided which has an external thread 102*a* provided thereon. The internal thread 101*a* of the insert engages with the external thread 102*a* of the cutter. The metal insert 101 is over moulded into the main section of the fitting housing (the "stack") 103. An O-ring seal is located in the lower region of the threaded insert 101 and, in use, is biased onto the cutter 102 so as to reduce the likelihood of blow-by. It can be seen from FIG. 1 that the O-ring seal 104 is located in a recess 105 which is machined into the insert for that purpose. By locating the O-ring seal 104 at the lowermost region of the stack 103, stresses on the stack are reduced, giving an advantage over the Plasson fitting.

However, the Friatec fitting is difficult and therefore expensive to manufacture because of its complexity. The fitting 100 includes four precision components—the cutter itself 102 having an external screw thread, and secondly the internally-threaded metal insert 101 which has to be over-moulded into the housing main section 103 and assembled with the threaded cutter. It is difficult to install the O-ring seal 104 in the insert because the seal is retained in a recess 105 designed for the purpose so that the seal is constrained top and bottom. Thirdly, the Friatec fitting comprises a separate machined upper portion 106 which is also internally threaded and overmoulded into the housing main section so that it interacts with the threaded insert to resist axial movement thereof. Finally, there is an end cap 107 with its own external screw thread and O-ring seal. Overall therefore the Friatec fitting represents complex apparatus which is necessarily expensive to produce.

It is thus an object of the present invention to provide a tapping fitting which alleviates the problems of the prior art.

According to a first aspect of the present invention, there is provided a tapping fitting, suitable for application to a plastic pipe, comprising:

a housing including a hollow main section, the housing being attachable to a pipe;

a cutter assembly mountable within the hollow main section and axially moveable therein into a cutting position wherein the cutting blade engages the surface of a pipe to which the fitting is attached; and a direct seal between the housing and the cutter assembly, wherein, in use, the seal is maintained between the housing and the cutter assembly regardless of the axial position of the cutter assembly within the housing.

By using a direct seal, i.e. a single seal between the housing and cutter assembly, the number of parts is reduced as (unlike in Plasson) only one seal, and no "hollow stem" or other intermediate element is required. Also (unlike in Friatec) the simple construction means that the seal can simply be dropped into place from the top of the stack during assembly rather than needing to be fitted into a specially-constructed recess in the insert.

Furthermore, because sealing takes place much lower down the stack, the stack itself is not subjected to the stresses imposed by the pressurised gas or liquid in the main pipe. This leads to an extended fitting lifetime for a given pressure, or the ability to use a thinner wall section in the stack.

Preferably, the seal comprises a resilient ring, biased against the cutter assembly. Ideally, the seal is a U-seal, lip seal, O-ring or the like. Preferably the seal is servo-acting.

According to a second aspect of the present invention there is provided a tapping fitting, suitable for application to a plastic pipe, comprising:

a housing including a hollow main section, the housing being attachable to a pipe;

an internally-threaded insert, mountable within the hollow main section; and a cutter assembly comprising a cutting blade attached to a non-deformable cutter body, the cutter body having an external screw thread and being mountable within the internally-threaded insert and axially moveable therein into a cutting position wherein the cutting blade engages the surface of a pipe to which the fitting is attached;

the arrangement being such that upward axial forces imposed on the insert through the cutter assembly when the cutting blade cuts the pipe are prevented from axially moving the insert in the hollow main section by interference between the regions of the insert and hollow main section, said non-deformable cutter body supporting the insert against deformation in said regions when the cutting blade cuts the pipe.

According to a third aspect of the invention, there is provided a tapping fitting, suitable for application to a plastic pipe, comprising:

a housing including a hollow main section, the housing being attachable to a pipe;

an internally-threaded insert, mountable within the hollow main section; and a cutter assembly having an external screw thread, mountable within the internally-threaded insert before the insert is mounted within the housing, the insert being such that the cutter assembly can be mounted therein by substantially surrounding the cutter assembly with the insert and without the need to rotate the insert or the cutter assembly with respect to one another.

Preferably, the insert comprises two halves of a longitudinally-sectioned cylinder, the two halves being hinged together.

Alternatively, the insert comprises a plurality of longitudinal sections of a cylinder.

Alternatively, or in addition, the insert further comprises a plurality of protrusions on its external surface which provide a means of mechanical fixture and improve a friction fit of the insert within the main section of the housing.

Preferably, the insert further comprises one or more longitudinal external protrusions which, in use, act to prevent axial rotation of the insert within the main section of the housing.

Preferably, the insert is made of plastic, for example, polyethylene, polypropylene or PVC. Alternatively, the insert is made of metal, for example brass or stainless steel.

Preferably, the fitting further comprises a seal between the housing and the cutter assembly. Advantageously, the seal comprises a resilient ring, biased against the cutter assembly. Ideally, the seal is a lip seal, an O-ring or the like.

According to a fourth aspect of the invention there is provided an insert for a tapping fitting as described in any of the preceding paragraphs.

Preferred embodiments of the present invention will now be more particularly described, by way of example only, with reference to the accompanying drawings in which.

Figure 1A:
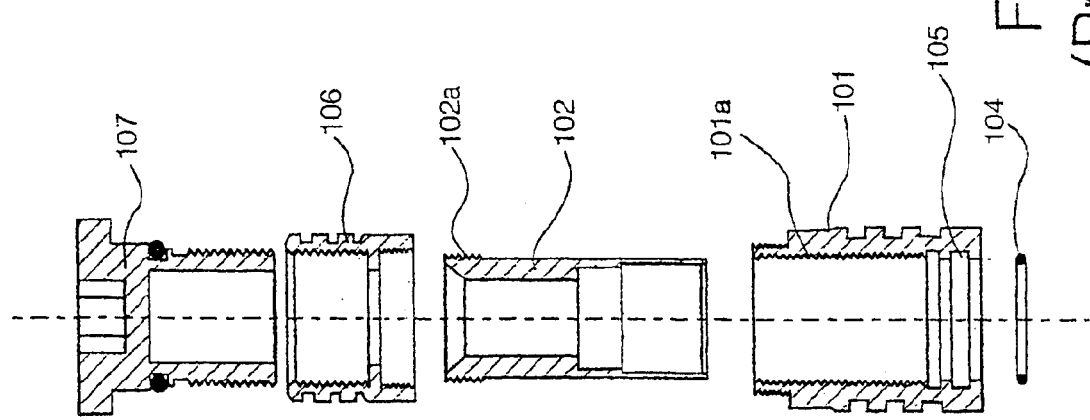
FIG. 1A is an exploded cross-sectional view of the metal component parts of the prior art fitting illustrated in FIG. 1.
Figure 1:
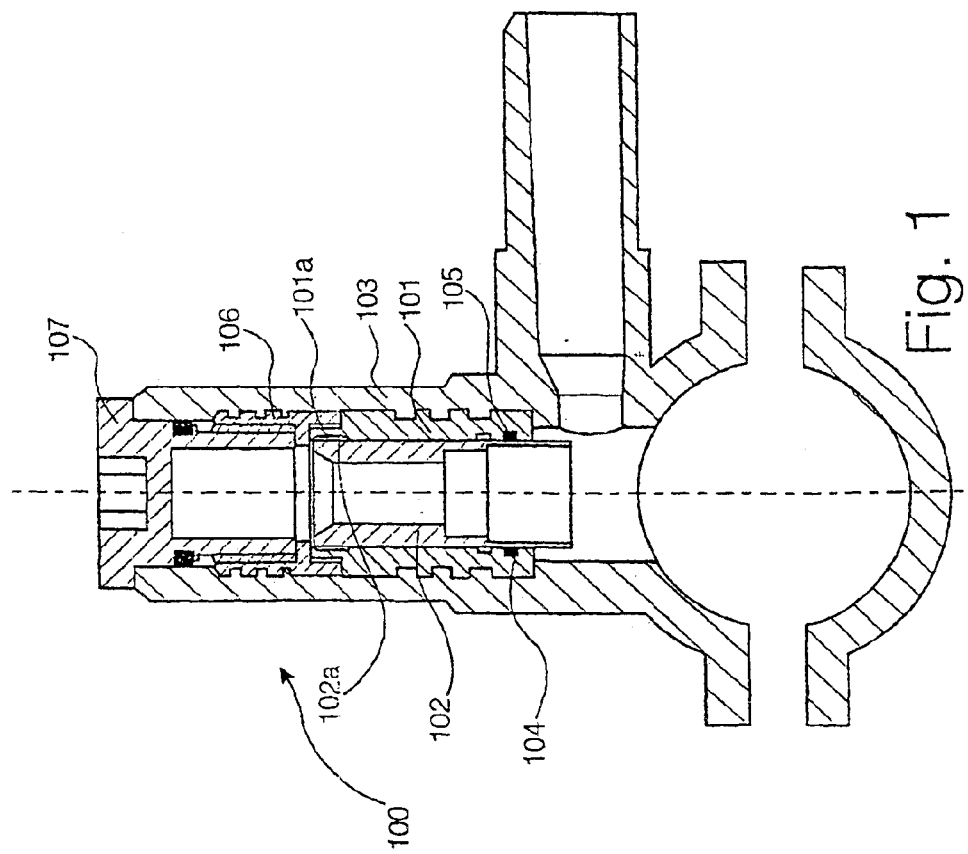
FIG. 1 is a cross-sectional side view of part of a prior art fitting.
Figures 2, 2A:
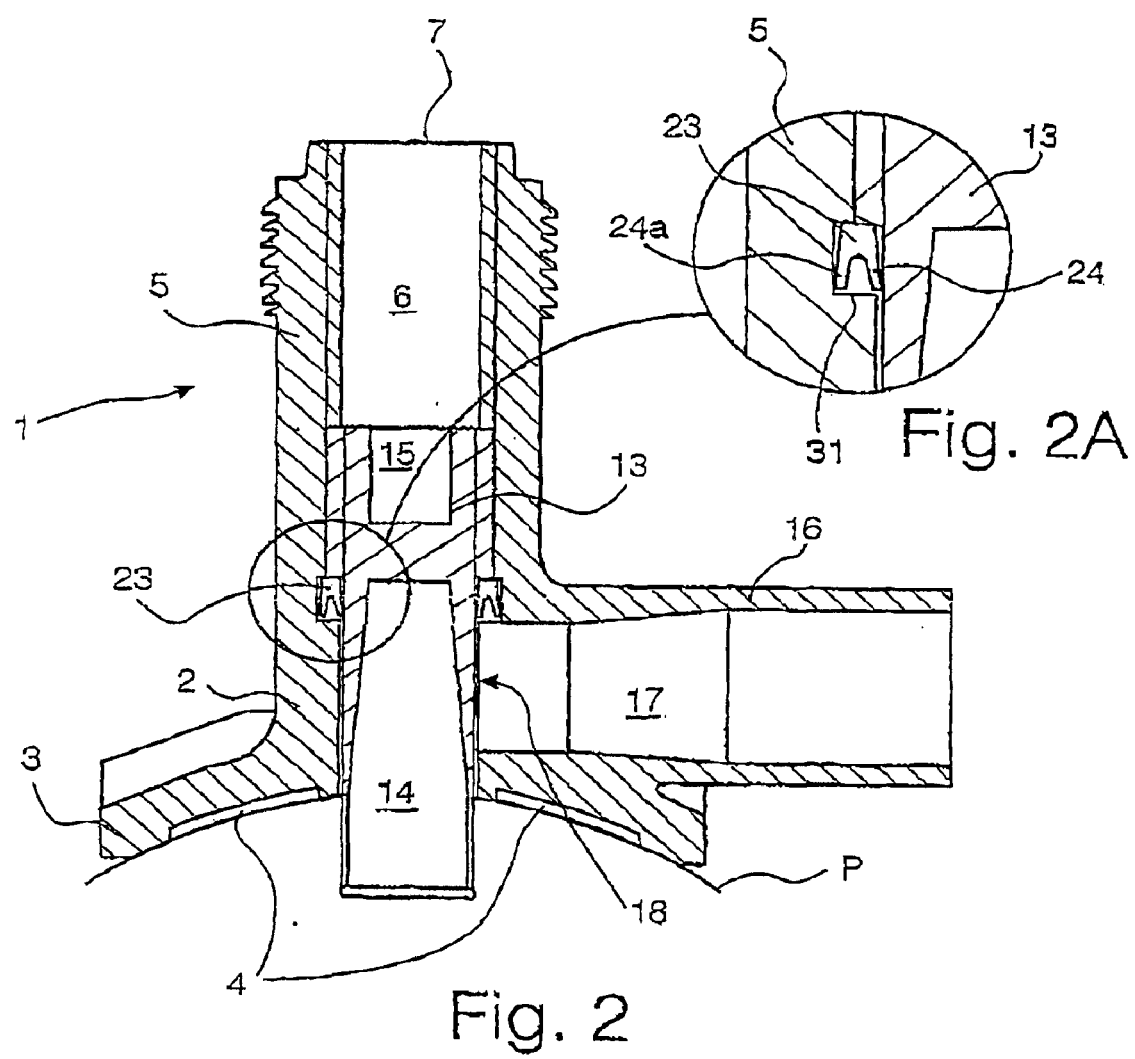
FIG. 2 is a schematic view of a tapping fitting embodying the first aspect of the invention, with the cutter assembly at the bottom of its stroke, the tapping fitting having a seal.
Figures 3, 3A:
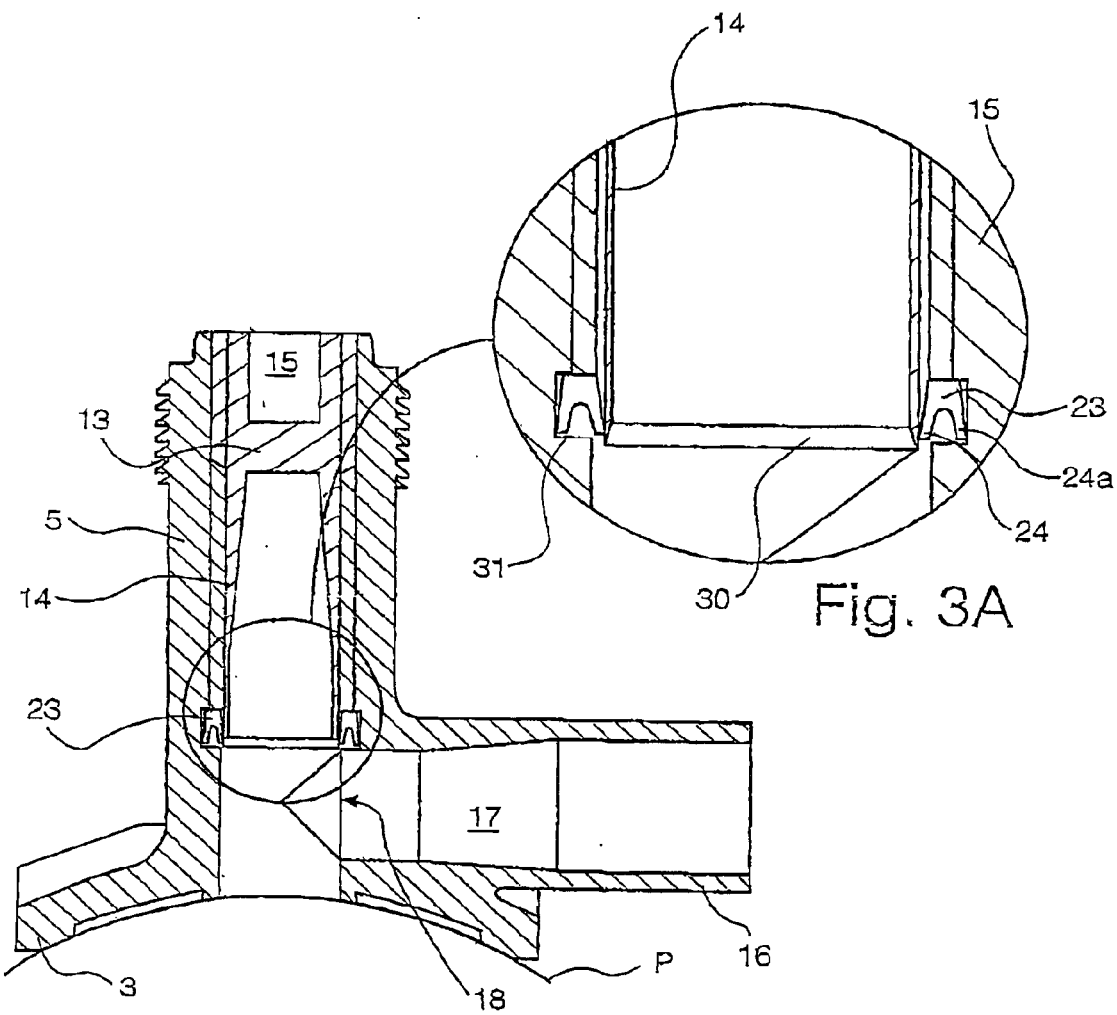
Figures 4, 4A:
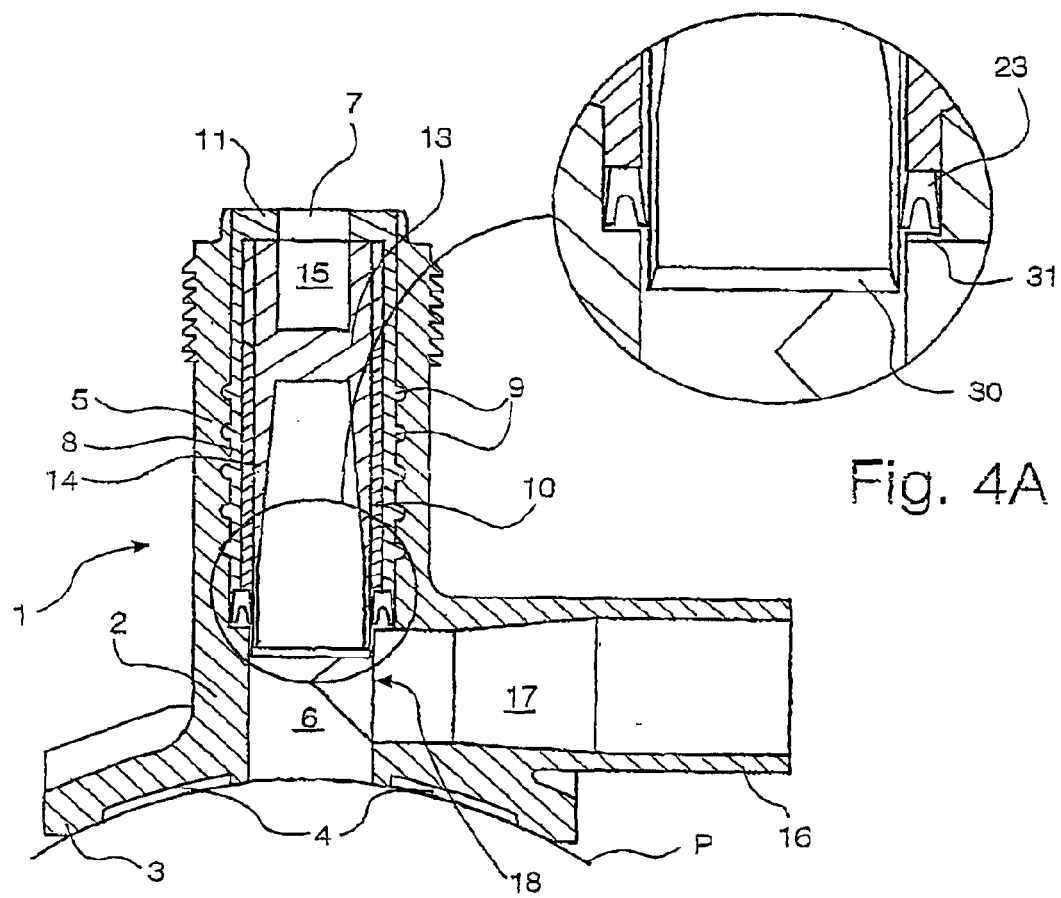
Figures 5, 5A:
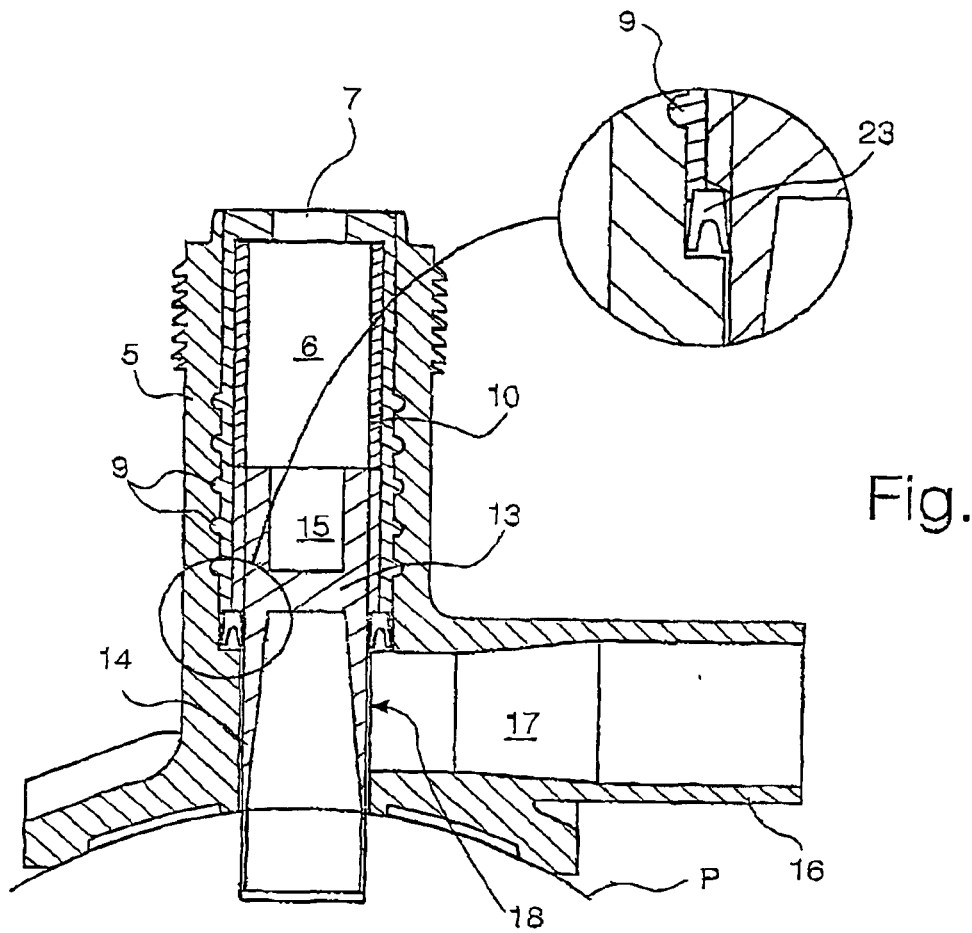
Figure 6:
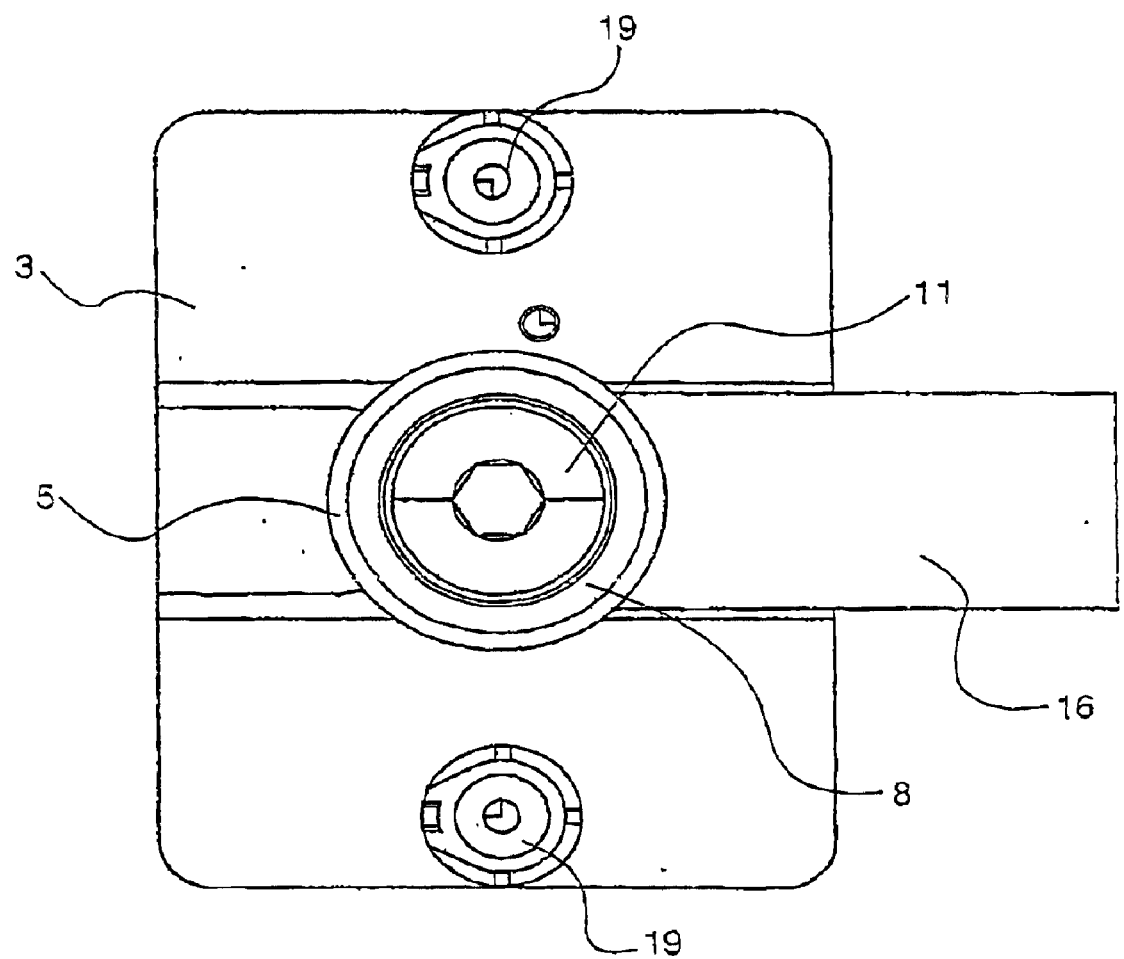
Figure 7A:
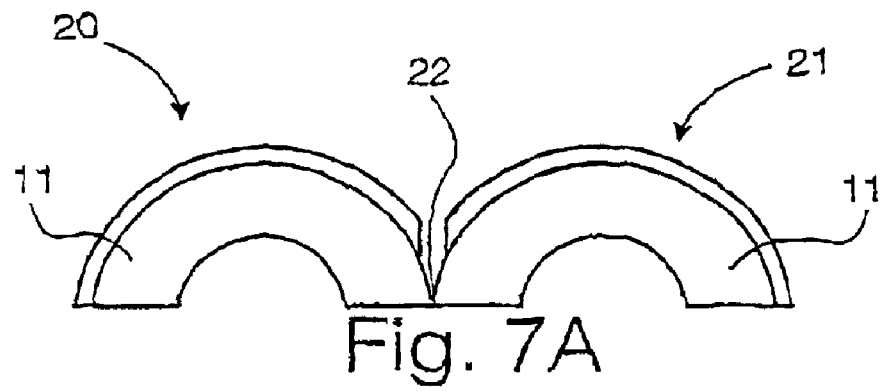
Figure 7:
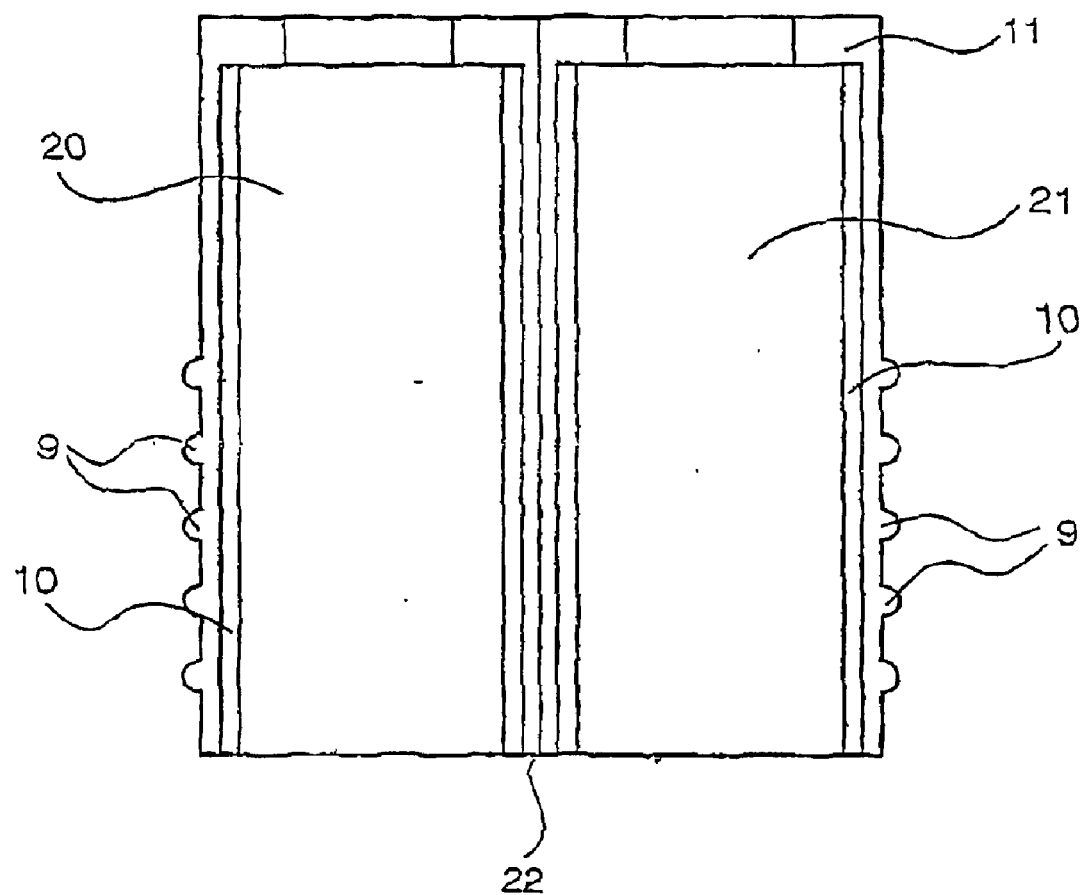

FIG. 2A, drawn to an enlarged scale, shows detail of the seal;

FIG. 3 shows the tapping fitting of FIG. 2 with the cutter assembly at the top of its stroke;

FIG. 3A, drawn to an enlarged scale, shows detail of the seal illustrated in FIG. 3;

FIG. 4 is a cross-sectional side view of a fitting according to the second and third aspects of the present invention, with the cutter assembly at the top of its stroke;

FIG. 4A, drawn to an enlarged scale, shows detail of the seal illustrated in FIG. 4;

FIG. 5 shows the tapping fitting of FIG. 4 with the cutter assembly at the bottom of its stroke;

FIG. 5A, drawn to an enlarged scale, shows detail of the seal illustrated in FIG. 5;

FIG. 6 is a top view of the tapping fitting of FIGS. 4 and 5;

FIG. 7 is a front view of the insert; and

FIG. 7A is a top view of the insert.

FIGS. 2, 2A, 3 and 3A show a tapping fitting according to the first aspect of the invention.

The tapping fitting 1 comprises a housing 2 which has a saddle-shaped lower portion 3 which can be fused to a pipe P by means of electrofusion elements 4. Connectors 19 for the electrofusion elements are shown in FIG. 6. The cylindrical main section 5 ("the stack") of the housing is upstanding from the saddle-shaped portion and is hollow, having a bore 6 leading from a top opening 7, down to the surface P of the pipe.

The housing 2 further comprises a branch connector 16 to which can be attached the auxiliary pipe which it is desires to join to the main pipe P. The branch connector 16 has a bore 17 therethrough which joins bore 6 of the fitting at junction 18.

A cutter assembly comprises a cutter body 13 and a cutting blade 14. The cutter body has a screw thread on the external surface thereof, which in use engages with a screw-thread on the internal surface of the main cylindrical section 5. Thus, by rotating the cutter assembly, the cutting blade 14 can be advanced towards or retracted away from the surface of the pipe P.

A keyhole 15 is located in the upper surface of the cutter body. The keyhole 15 is of polygonal cross-sectional shape, for example hexagonal or square, and is intended to receive therein a correspondingly-shaped key (not shown) with which an operator can rotate the cutter assembly about the longitudinal axis of the main section of the housing.

By rotating a key in the keyhole 15, the cutter assembly can be advanced towards the pipe P until a cutting position is reached, in which the cutting blade 14 engages the pipe P. Further advancement of the cutter assembly causes the blade 14 to cut into the surface of the pipe P and, eventually, through to the interior thereof. At this stage, a cylindrical piece of plastic 30 (a coupon, plug or slug) has been cut from the pipe P and is retained in the cutting blade 14. This makes an effective seal in the bore of the cutter, which is needed if there is a pressure testing aperture in the cutter body. By reversing the direction of rotation of the key, the cutter assembly can be retracted away from the pipe P. Once the cutting blade 14 has been retracted fully past the junction 18 with the branch connector 16 (as shown in FIG. 3), the tapping operation is complete as a conduit has now been formed between pipe P and the auxiliary pipe (not shown) connected to the branch connector 16.

The fitting also comprises an annular seal 23 located within the main section of the housing. The seal 23 has a resilient inner portion 24 which is normally biased against the cutter assembly so as to prevent "blow-by" i.e. the undesirable escape of liquid or gas from the main pipe P out of the top opening 7 of the tapping fitting.

This arrangement has the advantage over the prior art that a single seal is used, sealing directly between the cutter assembly and the housing. Since the seal 23 is biassed against the cutter assembly, the seal is maintained even as the cutter assembly moves axially with respect to the housing. In this way, the seal 23 is equally effective regardless of the actual vertical position of the blade.

Provision of the seal 23 also has the added advantage of prolonging the life of the tapping fitting or facilitating the use of thinner wall sections, as the stack 5 is not subjected to the pressure from the liquid or gas in the main pipe P during and after the cutting operation.

The seal 23 is preferably a U-seal, as illustrated. This has the advantage of being servo-acting, i.e. the pressurized gas in the main pipe which is trying to leak past the seal does, in fact, increase the sealing capability by urging the lowermost "arms" 24, 24a of the seal outwardly away from one another.

The invention has a further advantage in that manufacturing of the fitting is greatly simplified compared with, for example, the Friatec fitting. A ledge 31 is formed within the housing, onto which the seal 23 can simply be dropped during assembly of the fitting. This is possible because the seal 23 needs to be in direct contact with the housing 2, unlike in the Friatec fitting wherein the seal is located within a specially-formed recess machined into a metal insert which, in turn, is located (by overmoulding) within the housing main section.

However, other types of seal may be employed, for example an O-ring seal or a lip seal.

A tapping fitting according to the second and third aspects of the invention is shown in FIGS. 4 and 5.

In this tapping fitting, a polyethylene (or other suitable material) insert 8, described in more detail below, is inside the main section of the housing. The separately manufactured or moulded insert 8 is substantially cylindrical in shape and has annular ribs 9 protruding from its outer surface which help to maintain the mechanical/friction fit of the insert inside the housing. Other shaped protrusions, ribs or the like may be envisaged.

The interior surface of the insert 8 is provided with a screw-thread 10 and the uppermost region has a reduced internal diameter 11 so as to act as a means of retaining and providing access to the cutter assembly with the tool. The aperture provided is concentric with the opening 7 of the housing 2.

The cutter body 13 is non-deformable and is made of brass, for example. Alternatively, the cutter body could be made of non-deformable plastics. The cutter body has a screw thread on the external surface thereof, which in use engages with the screw-thread 10 on the internal surface of, the insert 8. Thus, by rotating the cutter assembly, the cutting blade 14 can be advanced towards or retracted away from the surface of the pipe P.

A key feature of this tapping fitting relates to the interaction of the cutter body 13 with the insert 8 during the cutting operation. When the cutter assembly reaches the cutting position, the pipe P resists the cutting action and axial forces are applied to the blade 14 and cutter body 13. This force is also applied to the insert 8, whose screw thread is engaged with that of the cutter body 13. This may result in a tendency for the insert and cutter assembly to be urged axially away from the surface of the pipe P. However the presence of the ribs 9 means that the insert is jammed against the non deformable cutter body 13 so that the insert 8 cannot deform inwardly, which would release the ribs 9 from recesses formed in the wall of the housing. The tapping fitting is so dimensioned that, when the cutter assembly reaches the cutting position, the non-deformable cutter body 13 is adjacent a region of the insert 8 which has ribs 9. It is not necessary for the entire length of the insert 8 to be provided with ribs 9m, as shown in FIGS. 4 and 5.

The construction of the insert 8 is shown in more detail in FIGS. 7 and 7A. The insert is made from polyethylene, polypropylene or PVC, for example. The moulded plastic insert 8 comprises two halves 20, 21 of a cylinder, which has been sectioned i.e. bisected longitudinally. The two halves 20, 21 may be joined longitudinally by a knife edge hinge 22 and can therefore be "closed" into a cylinder when required by hinging the halves together.

This construction has the significant advantage that, when it is required to assemble the cutter assembly and insert 8, one half 20 of the insert 8 can simply be placed adjacent to the cutter assembly, the screw threads aligned, and the other half 21 "closed" around the cutter assembly. This avoids the time-consuming necessity to screw the cutter assembly down into the insert during assembly, which would be required if the insert was a one-piece cylinder.

A second advantage this construction offers is that the thread can be manufactured more cost effectively and by more reliable processes, for example injection moulding.

The insert need not necessarily be in the form of a bisected and hinged cylinder as illustrated in FIGS. 7 and 7A. In an alternative embodiment (not illustrated), the insert may comprise a plurality of longitudinal sections of a cylinder which are not joined together, but which can be placed around the cutter assembly, with their screw threads aligned.

It is intended that the body 13 of the cutter assembly should be surrounded by the upper region of the insert 8 when the two are assembled together, so that the cutter body 13 is not adjacent the annular ribs 9.

When the cutter assembly and insert are assembled as described above, they are inserted together into the main section 5 of the housing 2. The cutter assembly and insert are pushed into the bore 6 so as to form a friction mechanical fit therein. The lower region of the insert (i.e. the region not adjacent the cutter body) may deform inwardly during insertion as a result of the protruding ribs 9.

One or more longitudinal eternal protrusions (not illustrated) may be provided on the insert 8 to prevent the friction/mechanically fitted insert from rotating axially within the housing when the key is used to rotate the cutter assembly.

Alternatively, or in addition to the friction/mechanical fit, a supplementary means of fastening the threaded sleeve to the main body 2 may be employed. For example the insert 8 may be fused into the housing.

When the tapping fitting is in use, as the cutter body 13 is initially advanced towards the pipe P, it will be in the upper region of the insert 8 and hence not adjacent any of the ribs 9. As the non-deformable cutter body reaches the region of the ribs, any inward radial movement of the insert will be resisted, ensuring that the ribs remain urged firmly into the wall of the housing. This benefit becomes more apparent, as already described above, when it is desired to resist the forces induced during cutting. Because the cutter body is non-deformable, the adjacent region of the insert (and the ribs attached thereto) can only move more firmly into the wall of the housing, thus resisting the tendency of the insert to move axially away from the pipe P.

The tapping fitting may also, optionally, include the "zero blow-by" feature described above. A U-seal 23 is provided and can simply be dropped onto ledge 31 during assembly. There is no need for any special recess to be formed in the insert or the housing to receive the seal and the seal 23 seals directly between the housing and the cutter, which has the advantages outlined above.

What is claimed is:

1. Tapping fitting, suitable for application to a plastic pipe, comprising:
   a housing including a hollow main section defined by a housing wall, said housing wall having a plurality of recesses formed therein, the housing being attachable to a pipe;

an internally-threaded insert mountable within the hollow main section, said insert having an upper most region defining a stop said insert further having protrusions formed on an outer surface thereof; and a cutter assembly comprising a cutting blade attached to a non-deformable cutter body, the cutter body having an external screw thread and being mountable within the internally-threaded insert and axially moveable therein from a first position delimited by said stop to a second cutting position wherein the cutting blade engages the surface of a pipe to which the fitting is attached, said protrusions being deformable as said cutter is moved along said insert thereby deforming the protrusions into the corresponding recesses in said housing wall; and wherein upward axial forces imposed on the insert through the cutter assembly when the cutting blade cuts the pipe are prevented from axially moving the insert in the hollow main section by interference between the deformed protrusions and the recesses in the housing wall, said non-deformable cutter body supporting the insert against deformation in said regions when the cutting blade cuts the pipe.

2. Tapping fitting, as claimed in claim 1, wherein the cutter assembly is mountable within the internally-threaded insert before the insert is mounted within the housing, the insert being such that the cutter assembly can be mounted therein by substantially surrounding the cutter assembly with the insert and without the need to rotate the insert or the cutter assembly with respect to one another.

3. Tapping fitting as claimed in claim 1 wherein the insert comprises two halves of a longitudinally-sectioned cylinder, the two halves being hinged together.

4. Tapping fitting as claimed in claim 1 wherein the insert comprises a plurality of longitudinal sections of a cylinder.

5. Tapping fitting as claimed in claim 1 wherein the insert further comprises a plurality of protrusions on its external surface which provide a means of mechanical fixture and improve a friction fit of the insert within the main section of housing.

6. Tapping fitting as claimed in claim 1 wherein the insert further comprises one or more external protrusions which, in use, act as an axial stop to prevent rotation of the insert within the main section of the housing.

7. Tapping fitting as claimed in claim 1 wherein the insert is made of plastic, for example, polyethylene, polypropylene or PVC.

8. Tapping fitting as claimed in claim 1 wherein the insert is made of metal.

9. Tapping fitting as claimed in claim 1 wherein the fitting further comprises a direct seal between the housing and cutter assembly.

10. Tapping fitting as claimed in claim 9 wherein the seal comprises a resilient ring, biased against the cutter assembly.

11. Tapping fitting as claimed in claim 9 wherein the seal is selected from the group consisting of a U-seal, lip seal, or o-ring.

12. Tapping fitting as claimed in claim 9 wherein said seal is servo-acting.

13. A method of assembling a tapping fitting comprising the steps of:

providing a housing including a hollow main section defined by a housing wall, said main section having a bore formed therethrough, the housing being attachable to a pipe;

providing an insert having internal screw threads and a plurality of protrusions formed on an outer surface thereof;

providing a cutter assembly including a cutting blade and a cutter body attached to the cutting blade, the cutter body having external screw threads;

attaching the insert to the cutter assembly by placing the insert over substantially the entire length of the cutter assembly and aligning the internal screw threads and external screw threads; and simultaneously mounting the insert and the cutter assembly in the main section by pressing the cutter assembly and attached insert through the bore, said insert being deformable in response to said pressing, and said protrusions being positioned in corresponding recesses formed in said housing wall so as to form a friction mechanical fit therein as the cutter assembly is moved along the insert and in close proximity to the protrusions.

14. A method, as claimed in claim 13, wherein:

said method further includes the step of placing a seal between the housing and the cutter assembly, wherein the seal is maintained between the housing and the cutter assembly regardless of the axial position of the cutter assembly within the housing.

15. A method, as claimed in claim 13, wherein:

the seal is selected from the group consisting of a u-seal lip seal, or o-ring seal.

16. A method, as claimed in claim 13, wherein:

upward axial forces imposed on the insert through the cutter assembly when the cutting assembly cuts the pipe are prevented from axially moving the insert in the main section by interference between said protrusions and said corresponding recesses in said housing wall, said cutter body being non-deformable and supporting the insert against deformation in said region when the cutter assembly cuts the pipe.

17. A method, as claimed in claim 13, wherein:

said mounting step is achieved without a need to rotate the insert or the cutter assembly with respect to one another.

18. A method, as claimed in claim 13, wherein:

the insert comprises two halves of a longitudinally sectioned cylinder, the two halves being hinged together.

19. A method, as claimed in claim 13, wherein:

the insert comprises a plurality of longitudinal sections of a cylinder.

20. A method, as claimed in claim 13, wherein:

said protrusions further act as an axial stop to prevent rotation of the insert within the housing.

* * * * *

UNITED STATES PATENT AND TRADEMARK OFFICE
CERTIFICATE OF CORRECTION

PATENT NO. : 6,907,896 B1
DATED : June 21, 2005
INVENTOR(S) : Mario John Christodoulou et al.

It is certified that error appears in the above-identified patent and that said Letters Patent is hereby corrected as shown below:

Column 7,
Line 3, after "stop", insert -- , --.

Signed and Sealed this

Twenty-third Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,907,896 B1 Page 1 of 1
APPLICATION NO. : 10/416903
DATED : June 21, 2005
INVENTOR(S) : Mario John Christodoulou et al.

It is certified that error appears in the above-identified patent and that said Letters Patent is hereby corrected as shown below:

Title page ITEM (75) please delete "Bowman A. Bowman, Chesterfield" and insert --Jeremy A. Bowman, Chesterfield-- therein.

Signed and Sealed this

Twenty-ninth Day of January, 2008

JON W. DUDAS
*Director of the United States Patent and Trademark Office*